(12) United States Patent
Bakhmutsky

(10) Patent No.: US 6,844,883 B2
(45) Date of Patent: Jan. 18, 2005

(54) COLOR NON-UNIFORMITY CORRECTION METHOD AND APPARATUS

(75) Inventor: Michael Bakhmutsky, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 129 days.

(21) Appl. No.: 10/179,319

(22) Filed: Jun. 24, 2002

(65) Prior Publication Data

US 2003/0234796 A1 Dec. 25, 2003

(51) Int. Cl.[7] .................................................. G09G 5/00
(52) U.S. Cl. ...................... 345/606; 345/552; 345/536; 348/575
(58) Field of Search ................................. 345/606, 609, 345/530, 540, 552, 643; 348/575, 442

(56) References Cited

U.S. PATENT DOCUMENTS

| | | | | |
|---|---|---|---|---|
| 5,081,575 A | * | 1/1992 | Hiller et al. | 710/317 |
| 5,528,302 A | * | 6/1996 | Basoglu et al. | 348/442 |
| 6,104,413 A | * | 8/2000 | Cheng et al. | 345/552 |
| 6,271,825 B1 | * | 8/2001 | Greene et al. | 345/694 |

FOREIGN PATENT DOCUMENTS

JP          8171371    * 7/1996    ............ G09G/3/36

* cited by examiner

*Primary Examiner*—Matthew C. Bella
*Assistant Examiner*—Alysa N. Brautigam

(57) ABSTRACT

A method of correcting a video signal includes retrieving a correction data from a respective one multiple memory devices; reordering the correction data to a predetermined order for a particular segment; and interpolating multiple correction data so that all pixels in the particular segment have a corresponding one of the correction data. An apparatus for correcting video comprises multiple memory devices, each having multiple correction data; a cross-bar switch that reorders at least some of the data to a predetermined order for a particular segment; and an interpolator that calculates multiple interpolated correction data. One of the correction data corresponds to one of multiple pixels in the segment.

17 Claims, 4 Drawing Sheets

COLOR NON-UNIFORMITY CORRECTION METHOD AND APPARATUS

FIELD OF THE INVENTION

The present invention relates generally to video processing for color displays, and in particular to a method and apparatus for providing color non-uniformity correction in color displays, including liquid crystal (LC) color displays.

BACKGROUND AND SUMMARY

Color displays are used in a variety of electronic devices. These include monitors for personal computers, televisions, and other video displays. These displays may be cathode-ray tube devices, or projection devices.

One type of projection device is based on the optical properties of liquid crystals, such as nematic crystals. These projection devices often include a layer of liquid crystal disposed over a semiconductor transistor array. Often, the array is one of complementary metal-oxide-semiconductor (CMOS) transistors that are used to selectively produce electric fields across the layer of liquid crystal. These electric fields change the polarization angle of the liquid crystal material molecules enabling the modulation of light that traverses this material. The light may be reflected by reflective elements or may be transmitted to the screen. In either case, the modulated light is projected onto a screen by optical elements forming a video image. In case of reflection, projection devices are referred to as liquid crystal on silicon (LCOS) projection displays.

Some factors that impact image quality of displays are resolution, brightness, contrast, and color depth. Resolution is the number of pixels a screen displays. Often, the resolution is expressed in a particular pixel dimension (e.g. 800×600 for many computer monitors). In this example, the monitor has 800 pixels in the horizontal dimension, and 600 pixels in the vertical dimension. Of course, the greater the number of pixels for a given display area, the smaller area of each pixel, and the greater the resolution.

Color depth defines how many colors can be displayed on a screen. Generally, color depth is described in binary logic (bits). Each of the three primary colors used in color displays (red, blue, green) has a number of bits that describes its color depth, or the number of shades of a particular color that may be displayed. The number of colors is normally described via binary exponential notation (e.g., $2^8$ (referred to as 8 bit video) for 256 shades of each of the three primary colors). As can be readily appreciated, the greater the number of color bits, the greater the number of shades of the color, and the greater the color depth. Of course, the greater the color depth, the better is the display quality.

While the resolution, brightness, contrast, and color depth may be chosen for a particular desired image quality, certain factors may deteriorate the image quality. For example, differences in both the optical path and the imager characteristics in LCOS projection devices can have deleterious effects on the quality of the projected image.

As it is useful to correct imaging errors in displays, a number of methods have been devised. One such method includes evaluating the brightness distributions individually for a set of video levels for each color path. However, not all of these picture elements are stored in memory for practical reasons.

What is needed is a correction method and apparatus, which overcomes certain drawbacks of known correction schemes.

In accordance with an exemplary embodiment of the present invention, a method of correcting a video signal comprises retrieving a correction data from a respective one of a plurality of memory devices; reordering the correction data to a predetermined order for a particular segment; and interpolating a plurality of correction data so that all pixels in said particular segment has a corresponding one of said correction data.

In accordance with another exemplary embodiment of the present invention, apparatus for correcting video comprises a plurality of memory devices, each having a plurality of correction data; a cross-bar switch, which reorders at least some of said plurality of correction data to a predetermined order for a particular segment; and an interpolator which calculates a plurality of interpolated correction data, wherein one of the correction data corresponds to one of a plurality of pixels in the segment.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the present invention relates to a method and apparatus for providing color non-uniformity correction in real-time without having to store all of the correction data for all the pixels of all the colors in a memory. In accordance with an exemplary embodiment of the present invention, a memory partitioning and organization method is usefully combined with a relatively straightforward address and data path architecture enabling bi-linear interpolation of all pixels of a display for correcting the color at each pixel.

To provide a high-quality correction, the color correction data may also be obtained for a variety of color levels. In an exemplary embodiment, four correction data are stored in a memory device in such a manner that they are substantially simultaneously available in a single memory access cycle. These data are used for the bi-linear (or other two-dimensional) interpolation at a particular video level in a grid (segment) of a particular area having a particular number of pixels. To effect color correction across the display, a plurality of color correction data representative of different locations of the display are stored for simultaneous access.

Figure 1:
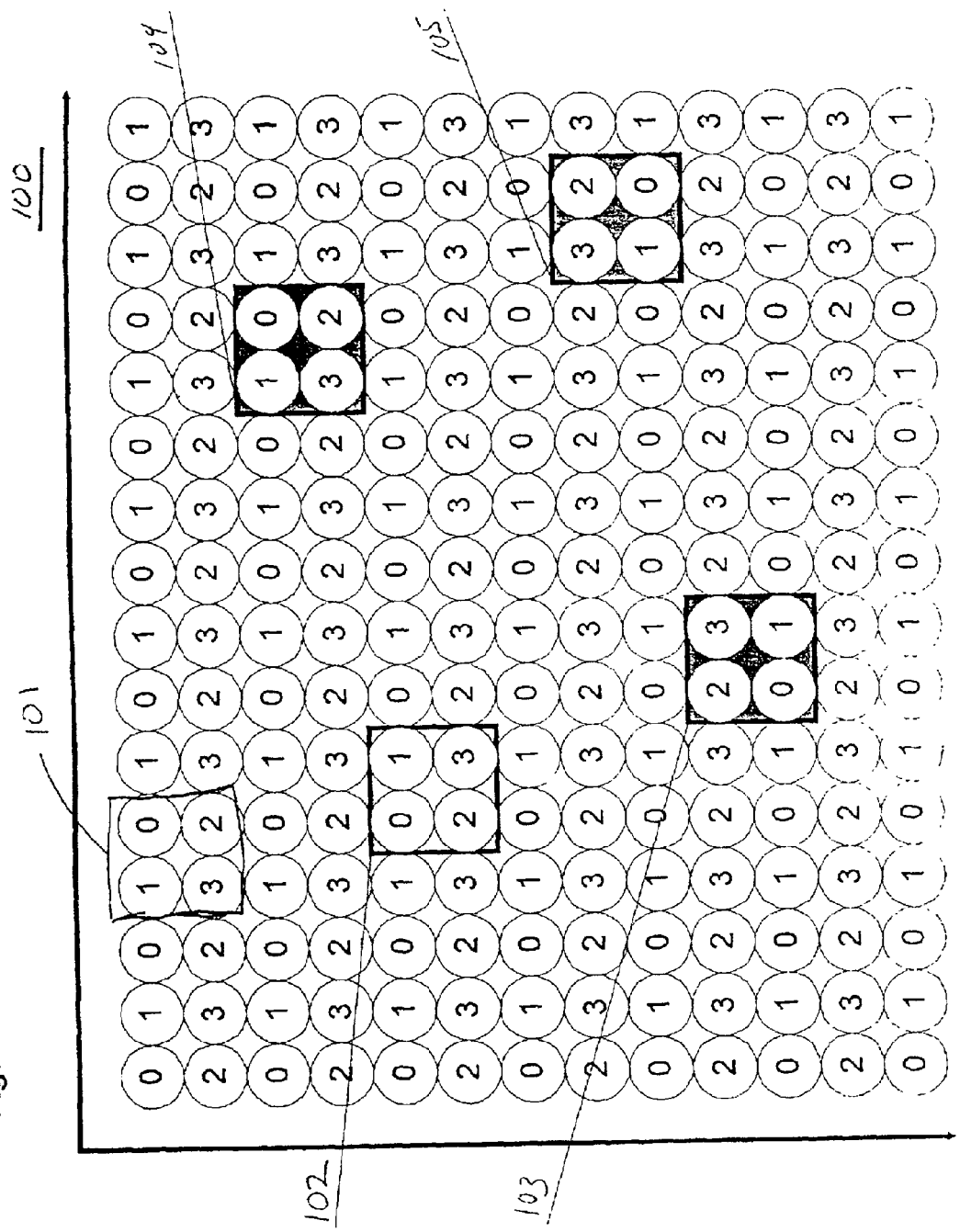
FIG. 1 is a perspective view of interleaved brightness correction coefficient memory segments in accordance with an exemplary embodiment of the present invention.

FIG. 1 illustrates interleaving of brightness correction data in accordance with an exemplary embodiment of the present invention. Illustratively, a correction data memory of one of the system colors has a limited number of storage elements 100 geometrically located at grid points across a display. As will become clearer as the present description proceeds, the correction data memory (not shown in FIG. 1) is illustratively partitioned into four memories 0,1,2 and 3. This partitioning technique allows the color correction data to be available in a single memory access cycle, which is illustratively a 10–12 ns clock period for 75 MHz to 100 MHz operation in a 1280×768 display.

In an exemplary calibration procedure described presently, the correction data are determined, and stored in the memory so that each 2×2 group (e.g., 2×2 group 101) of four adjacent correction data is written into respective memories 0,1,2 and 3 for the particular block.

Correction data are normally obtained by measuring the luminance levels across a display for a chosen number of video levels. This calibration method may be used to calculate an individual correction data set for each desired level of video (e.g., for 8-bit video having 256 video levels, one set is evaluated at projected video level 40, one at 75, one at 120, one at 170, one at 203, one at 240). It is noted that these video levels are merely illustrative of an exemplary calibration, and are intended in no way to be limiting of the exemplary embodiments. Most commonly, a gray color, which is characterized by equal levels of red, blue and green, is projected onto the screen and the light intensities are measured with a photometer or similar device for each color component individually. Based on these measurements, correction data, which are needed for further interpolation and video correction in real-time in the projection device, are computed. For purposes of illustration, and not limitation, video correction may be performed efficiently by offsetting the video; that is adding or subtracting an error signal. As such, the correction data may be arithmetically added to the video signal to provide the correction thereto.

Figure 4:
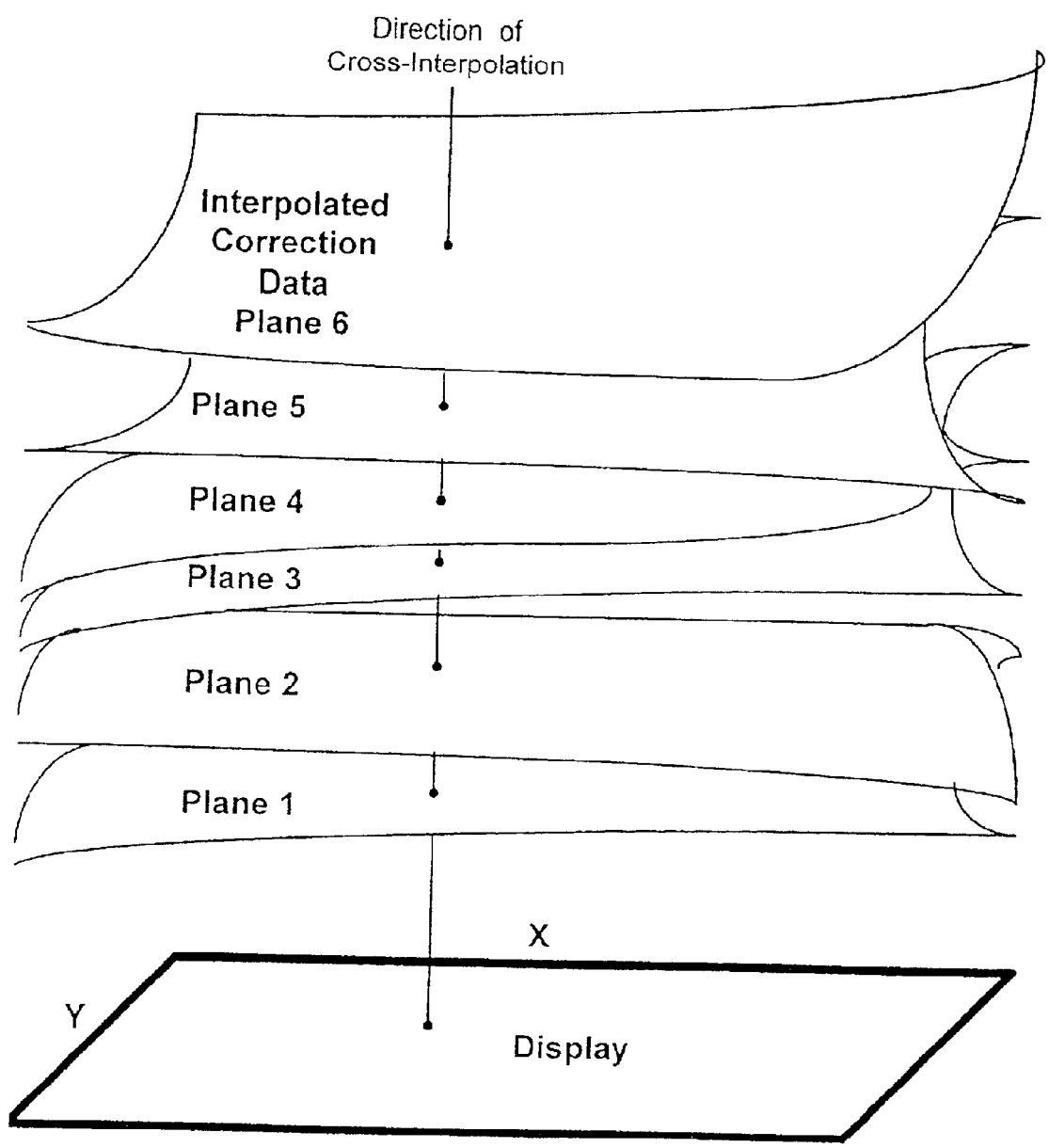
FIG. 4 is a perspective view of cross-interpolation in accordance with an exemplary embodiment of the present invention.

To further illustrate an interpolation method in accordance with an exemplary embodiment, FIG. 4 shows six exemplary 2-dimensional interpolated correction data planes, each produced by bi-linear interpolation from decimated data point values obtained from brightness-level measurements for one of six exemplary video levels. These planes overhang the x,y display coordinates for a single color. As can be appreciated, 256 of these planes per color would be useful to properly correct the video due to the highly non-linear dependency between the video levels (and ,of course, correction levels) and the brightness levels produced by them, so that each video level would have its own variation of correction.

However, it is well understood by those skilled in the art that such method would be impractical. According to an exemplary embodiment of the present invention, the intermediate planes (i.e., the planes that are "sandwiched" between the measured planes) are computed by means of cross-interpolation between the set of two (out of six) values between the corresponding selected two measured planes. In exemplary FIG. 4, Plane 1, Plane 2, Plane 3, Plane 4, Plane 5, and Plane 6 are measured planes. For example, if the video level at some point in the video is equal to 95, and the correction data for video levels 40, 75, 120, 170, 203, 240 are respectively 8, 14, 17, 15, 13, 18, then it is clear that the correction data will be interpolated in the 75 to 120 video level range, and between 14 and 17 in the correction data range.

From the above description, it is apparent that in order to perform all these computations in real-time, the four streams of correction data are usefully and immediately available for these computations.

Once the correction data are obtained for selected locations across the display, they are stored in a projection device memory (also referred to as a memory device) for further interpolation across the entire area of the display.

The obtained multiple correction data sets (several maps of correction data obtained at preset video levels for each color individually) are further used in the described correction system in such a way that the correction data are interpolated so that the individual pixel-level corrections are determined for each pixel location, with subsequent error compensation of video effected at these locations.

As can be readily appreciated, the correction data for each color level of each pixel may be ascertained; and it is conceivable that all of these data may be used to determine the color correction required. However, evaluation of all pixels requires the storage and retrieval a larger number of correction data.

By known techniques and apparati, several memory access cycles would be required to retrieve the group of four correction data values for each pixel. This can sacrifice the speed of the correction. In certain cases, such as when the pixel crosses a boundary between interpolation blocks, or at the beginning of a new video line, all of the four data values used in interpolation can change.

Advantageously, the interpolation method and apparatus of an exemplary embodiment of the present invention uses highly decimated correction data requiring less memory; and provides immediate access to the correction data within a single clock cycle of video processing, thereby allowing the correction data interpolation as the video is processed in real-time (referred to as correction 'on-the-fly'). As previously stated, in order to save memory, correction data are not stored for all pixels . Rather, correction data are stored for only a limited number of pixels located at a grid of points spaced a certain distance apart with respect to each other, both horizontally and vertically. Comparatively, this reduces significantly the memory required to store the correction data. Moreover, because a number of coefficients must be retrieved from the memory to produce a single interpolated value for each pixel, the speed of the correction, as stated earlier, can be sacrificed.

In the exemplary embodiment of FIG. 1, when it is necessary to read the memory and to interpolate the correction data assigned to the corners of interpolation blocks forming a grid of data points on a display X,Y coordinate plane, the appropriate group of four correction data must be readily available for consequent interpolation. Illustratively, a first segment 102 has four coefficients from each of the four memories 0, 1, 2 and 3. Using these particular correction data, bi-linear interpolation may be carried out to effect the required correction at any point of the pixel block having data in the corners, which are stored in segment 102 of the memory. As can be readily appreciated, all the four correction are guaranteed to be in different memory segments 0,1,2,3 allowing substantially simultaneous access to these memories. If these data were not located in different memories, sequential access to the same memory would be required, resulting in multiple clock cycles for retrieval of the correction data used for interpolation. As such, the exemplary embodiments afford an improvement in access time, and thereby a substantial advantage over known correction methods.

In the case of first segment 102, the four correction data are in the correct memory order. However, this is not always the case. A first segment 102, a second segment 103, a third segment 104 and a fourth segment 105 show four possible grouping combinations. These may be identified by four combinations of line/column and odd/even status. One useful observation that can be made from the illustrative representation of FIG. 1 is that at any location of the display (screen) these groups of four always comprise a combination where the data necessary for interpolation are guaranteed to be located in different memory segments. This facilitates the possibility of retrieving four different memory segments substantially simultaneously in order to supply them to interpolation circuitry in a single clock cycle. As will become more clear as the present description proceeds, addressing the memories correctly will produce the required correction data fostering bi-linear interpolation in a single access cycle and facilitating on-the-fly pixel modifications at any point of the display.

Figure 2:
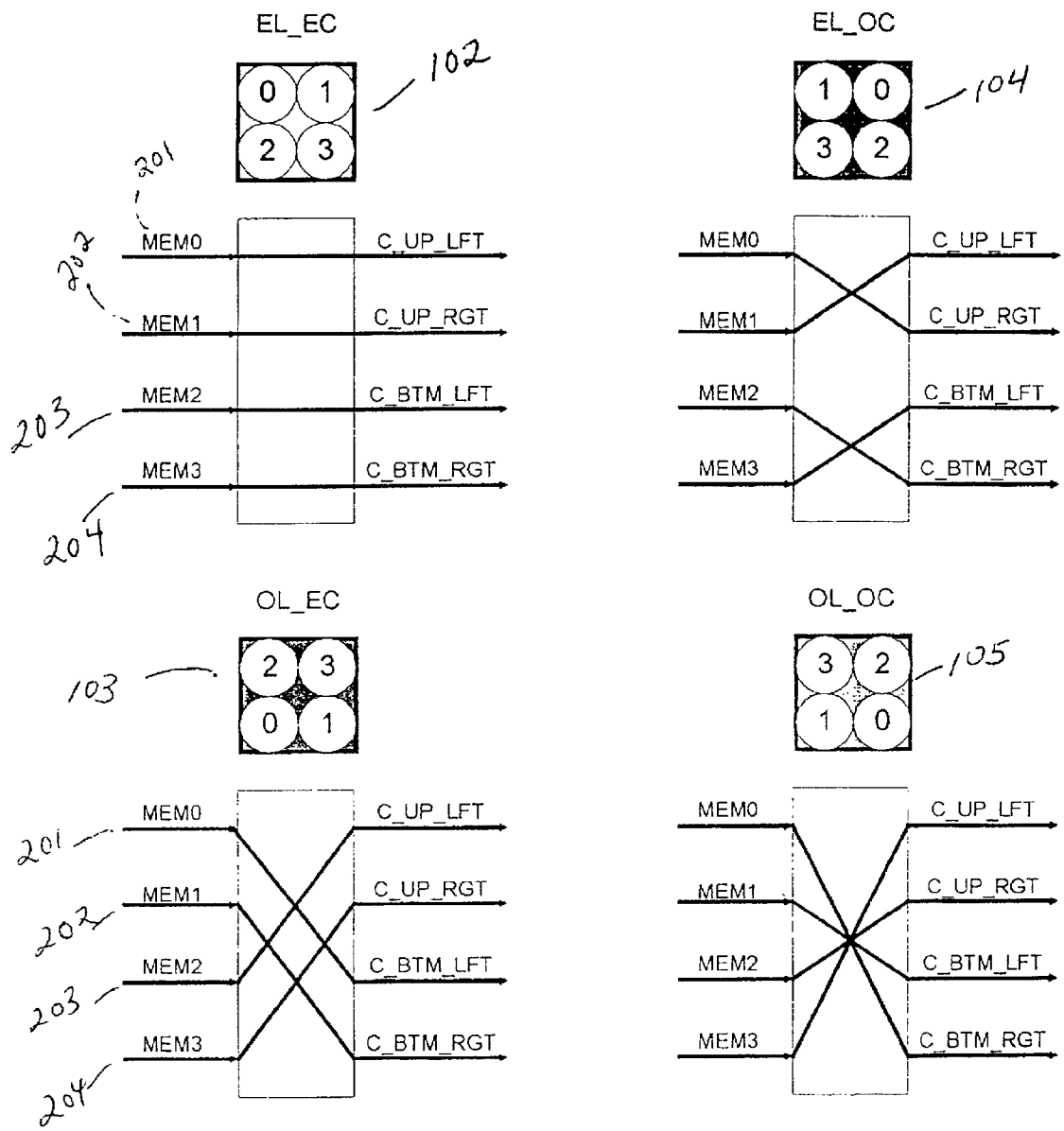
FIG. 2 is an illustration of coefficient reordering by crossbar switches in accordance with an exemplary embodiment of the present invention.

FIG. 2 shows a reordering method for correction data retrieval in accordance with an exemplary embodiment of the present invention. As described previously, the correction data are readily retrievable in one clock cycle. However, the ordering may need to be corrected (in this case it needs to be reordered in three out of four cases).

Illustratively, the first segment 102 of FIG. 1 is depicted in FIG. 2, and because it is in the correct order, it requires no re-ordering before being presented to a bi-linear interpolator (not shown), which interpolates the correction data for all pixels of the pixel block corresponding to first segment 102. As such, the correction data are retrieved from a first memory (MEM0) 201 and mapped to the upper left position (C UP LFT) of the particular column and row (in this case, a particular even column and a particular even row). Likewise, the correction datum (data) retrieved from a second memory (MEM1) 202 is (are) mapped to the upper right (C UP RGT) column of the first segment 102. Consistently, the correction data from the third and fourth memories 203 and 204, respectively, are mapped directly as shown.

The second segment 103 requires re-ordering upon retrieval to enable bi-linear interpolation. In this case, a correction datum from the first memory 201 is mapped to the bottom of the left column (C BTM LFT) of the second segment 103. The correction data from the second, third and fourth memories, 202, 203 and 204, respectively, are de-interleaved as shown.

In a manner similar to that described in connection with the first segment 102 and the second segment 103, the appropriate correction data from the first through fourth memories, 201, 202, 203, and 204, respectively, are mapped to the appropriate positions as shown. In this manner, the interpolation circuitry can be supplied in a substantially uninterrupted manner with multiple pieces of correction data at the same time in one clock cycle of memory access, thereby facilitating "on-the fly" video correction for all pixels individually.

Figure 3:
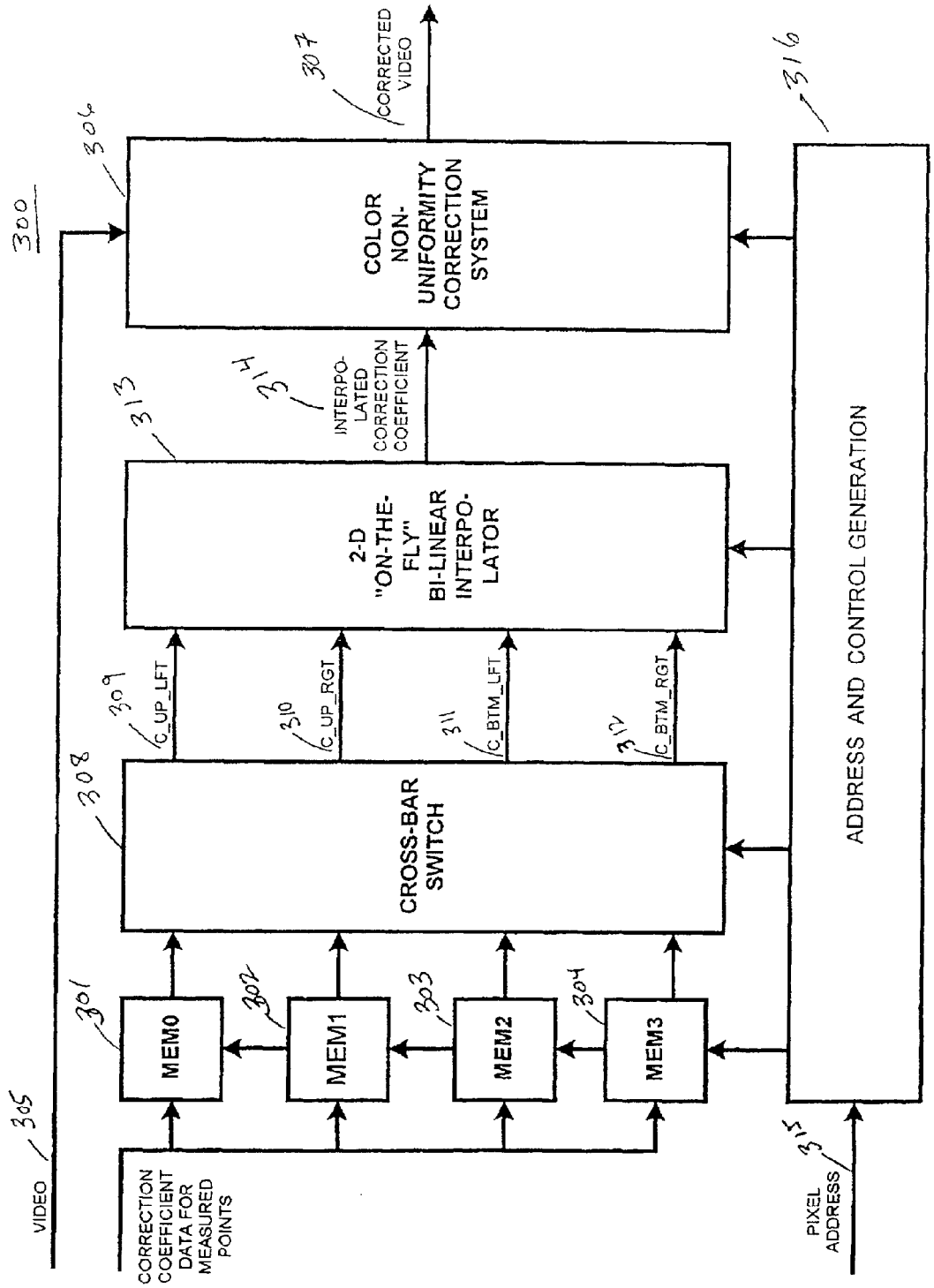
FIG. 3 is a functional block diagram of a color non-uniformity correction apparatus in accordance with an exemplary embodiment of the present invention.

FIG. 3 shows a color non-uniformity correction apparatus 300 for a single color in accordance with an exemplary embodiment of the present invention. The apparatus 300 provides immediate access to the respective correction data (four for each segment), orders them, and interpolates the color correction data for all pixels of the display.

The correction data are stored in the described order in first memory segment 301, a second memory segment 302, a third memory segment 303 and a fourth memory segment 304. These data are illustratively obtained using measurement procedures known in the art, and described above in connection with FIG. 4. A video signal (e.g., streaming video) 305 is input to a color non-uniformity correction circuit 306, which modifies the video every clock cycle based on the interpolated input 314, with the corrected video 307 output to the display (not shown).

The correction data stored in first through fourth memories 301-304 correction data are retrieved from the memories and input into a cross-bar switch 308, which reorders the coefficients in a manner described conceptually in FIG. 2. The outputs from the crossbar switch 308 are an upper left output 309, an upper right output 310, a bottom left output 311, and a bottom right output 312. These outputs from the crossbar switch are the reordered correction data described in detail above.

A two-dimensional interpolator 313 computes a correct compensation value for each video pixel. These data are output as interpolated correction data 314, and input to the color non-uniformity correction system 306. The color non-uniformity correction system makes necessary adjustment to the video producing the single-color output 307. After all interpolations are computed for all video levels and a video level is available for a certain X,Y location of the display, a cross-interpolation is performed in the correction system 306 to find the value between planes, such as those shown in FIG. 4. This cross-interpolation is video level dependent. Therefore, color non-uniformity correction system 306 has video as an input. The resulting value is simply added to the video signal, thereby correcting it for color non-uniformity. It is noted that the exemplary embodiment shown in FIG. 3 represents video correction of one of the primary video colors. A similar color non-uniformity correction apparatus 300 would be used for video color correction of the other two colors.

As referenced above, each interpolation block of pixels is characterized by only four correction data values. Each pixel of each such block of the display is corrected by the interpolation method and apparatus described. As can be appreciated, it is necessary to supply the pixel timing signals and appropriate memory addresses to the elements of the apparatus 300. These timing signals are derived based on the pixel address 315, which is supplied to an address and control generation device 316. The control generation device 316 provides timing, control and memory addressing signals to each of the crossbar switch 308, the interpolator 313, and the color non-uniformity correction system 306. It is noted that the control generation device 316 may be common to the color non-uniformity correction apparati (not shown) used for correcting the other two colors.

In an exemplary embodiment of the present invention, each pixel of each color has to be corrected based on its position on the display and its color level. In an exemplary embodiment in which a projection LCD video display image is corrected using a method and apparatus of the present invention, the correction level dependency may be due to the non-linear characteristics of the LC material and certain correctable defects of the display. The problem is solved by producing a plurality of level-dependent correction maps, with subsequent interpolation in accordance with an exemplary embodiment of the present invention.

In operation of an LCD projection system, the individual pixel correction data are derived from four measured coefficients located at corner points of the particular grid (location on the display). The derivation of pixel-by-pixel correction data values is performed by bi-linear or other two-dimensional interpolation method. The interpolation is performed as a streaming video signal is processed (i.e., 'on-the-fly') using suitable correction data and horizontal and vertical internal offsets computed from the global pixel address for the pixel block formed by these correction data points.

It should be noted that the above method and apparatus is merely illustrative of the present invention. To wit, other methods and apparati may be employed. For example, the interpolation blocks do not need to be square with known correction data in the corner points of the block as described. In fact, other geometries may be used to segment the display. Of course, this may require modifications to interpolation method used to compute the correction data of points within these blocks; or may employ a different interpolation method altogether. In any event, the reordering method facilitates the substantially immediate availability of essential data for subsequent interpolation and "on-the-fly" video correction in real time.

The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

What is claimed is:

1. A method of correcting a video signal, the method comprising:
   retrieving correction data from a respective one of a plurality of memory devices, wherein the correction data are other than texel correction data;
   selectively reordering said correction data to a predetermined order for a particular segment; and
   interpolating a plurality of correction data so that all pixels in said particular segment are compensated using a corresponding one of said correction data.

2. A method as recited in claim 1, wherein said interpolating is effected by a two-dimensional interpolation technique.

3. A method as recited in claim 1, wherein said plurality of memory devices further comprises a first memory, a second memory, a third memory and a fourth memory.

4. A method as recited in claim 1, wherein said selective reordering further comprises:
   determining if said correction data requires reordering, and reordering said correction data based on said determining.

5. A method as recited in claim 2, wherein said two-dimensional interpolation technique is bi-linear interpolation.

6. A method as recited in claim 1, wherein the video signal is streaming, and the said pixels are compensated real time.

7. A method as recited in claim 1, wherein the method does not require a correction data to be stored in said plurality of memory devices for each of said pixels.

8. A method as recited in claim 1, further comprising, before said retrieving, obtaining said correction data by calibration.

9. A method as recited in claim 8, wherein said correction data are decimated data point values obtained from brightness-level measurements.

10. An apparatus for correcting video, comprising:
    A plurality of memory devices, each having a plurality of correction data, which are not texel correction data;
    A cross-bar switch, which reorders said plurality of correction data to a predetermined order for a particular segment; and
    An interpolator which calculates a plurality of interpolated correction data, wherein one of said correction data corresponds to one of a plurality of pixels in said segment.

11. An apparatus as recited in claim 10, wherein said plurality of memory devices further comprises a first memory, a second memory, a third memory, and a fourth memory.

12. An apparatus as recited in claim 10, wherein said interpolator is a two-dimensional interpolator.

13. An apparatus as recited in claim 10, wherein the apparatus correct one color of said video.

14. An apparatus as recited in claim 10, further comprising a control generation device, which provides a plurality of timing, control and memory addressing signals.

15. An apparatus as recited in claim 10, wherein the interpolator is disposed in a video projection apparatus.

16. An apparatus as recited in claim 14, further comprising three of the apparati, one for each primary color.

17. An apparatus as recited in claim 16, wherein said control generation device provides said plurality of timing, control and memory addressing signals to each of said apparati.

* * * * *